Jan. 10, 1961 J. C. FORD 2,967,474
FOOD COOKING MACHINE
Filed April 30, 1957 2 Sheets-Sheet 1
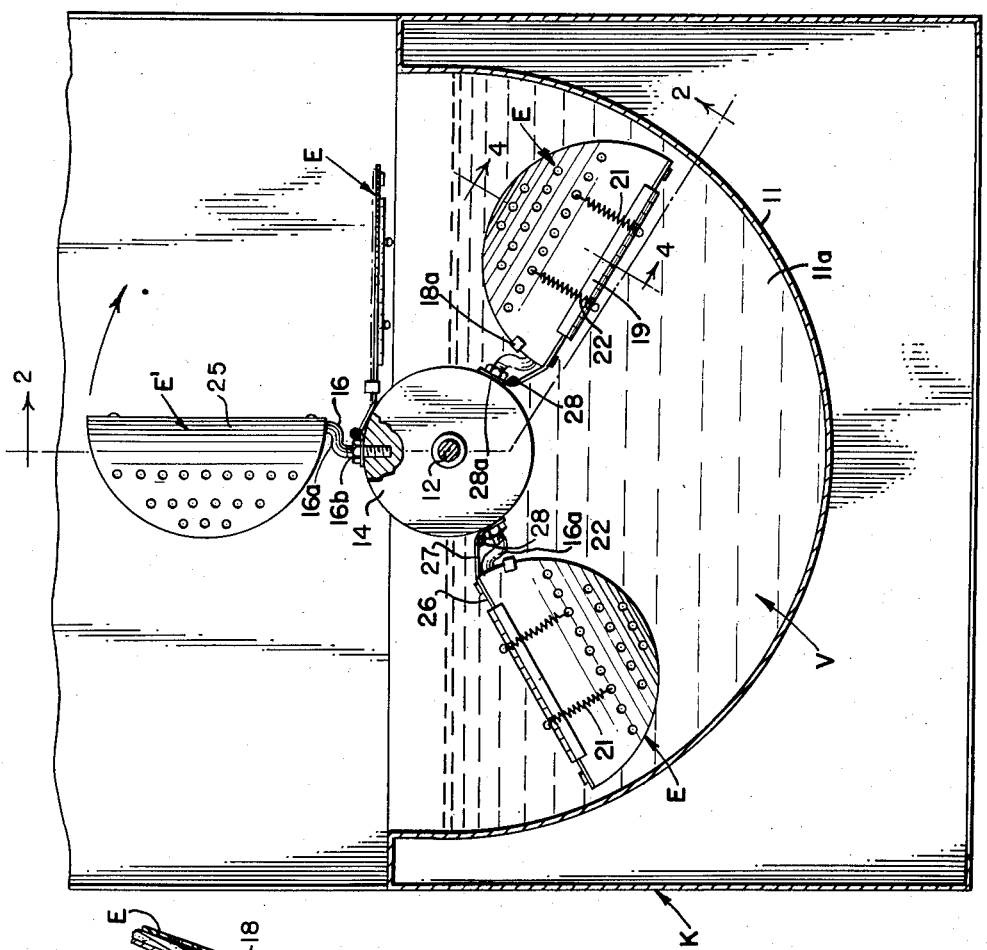
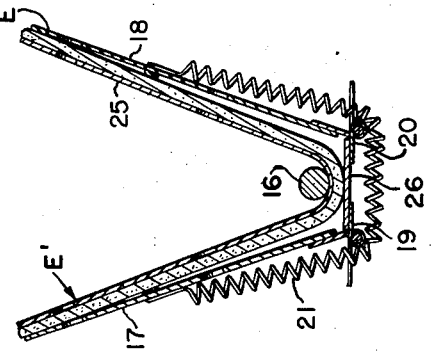
INVENTOR.
JOHN C. FORD
BY
ATTORNEY Jan. 10, 1961 J. C. FORD 2,967,474
FOOD COOKING MACHINE
Filed April 30, 1957 2 Sheets-Sheet 2

INVENTOR.
JOHN C. FORD
BY
ATTORNEY

United States Patent Office 2,967,474
Patented Jan. 10, 1961

2,967,474
FOOD COOKING MACHINE

John C. Ford, Monterey Park, Calif., assignor to J. C. Ford Mfg. Co., Monterey Park, Calif., a corporation of California Filed Apr. 30, 1957, Ser. No. 661,271

9 Claims. (Cl. 99—404)

This invention relates to a food cooking machine particularly adapted for cooking certain types of Mexican food which may especially be tortillas, although it is not limited to that particular type.

Tortillas and certain other types of Mexican foods constitute a V-shaped food product which is cooked in a vat of deep fat. The V-shape is essential to this particular food product for the reason that after being cooked other food products, such as relishes and the like, are placed between the halves of the product for serving and eating.

Machines of this general type have been known to the prior art but these prior art machines are subject to certain deficiencies and disadvantages. It is the purpose of the machine of this invention to overcome these deficiencies and disadvantages and to provide certain other improvements and points of superiority whereby substantial gains in efficiency are achieved.

In the prior art machines the food holding members have been of the type requiring that the food product be formed into a V-shape before being placed into the machine. The prior art machines also required certain manipulations involving latching the food holding members together before operation of the machine to move the food product into the deep fat for cooking.

The machine of this invention features an arrangement wherein the food holding mechanism involves a member which is normally in the form of a relatively flat plate on which the uncooked product may be simply placed as a round or oval and flat uncooked product to be made into a tortilla. Associated with the relatively flat holder member is a relatively moveable form member preferably of V-shape construction so that the resultant shape of the product, after the holders are brought into close juxtaposition, is a V-shaped product.

In a preferred form of the invention the normally flat plate member is round and has hinged side portions which are automatically foldable, or collapsible, into a generally V-shape form as the food holding mechanism is rotated into the vat of cooking fat. At the same time the food holding members are brought into close juxtaposition so that the food product is automatically formed into a V-shape in the process and is also automatically clamped or held between the two holding members as they move into the cooking fat for cooking. Thus, the arrangement greatly facilitates the making of these products, particularly tortillas, in that the uncooked product may be simply laid on the relatively flat holder member and then as a result of rotation of the food holding mechanism, as by way of a crank, the process is automatic in forming the product, holding it and cooking it.

In another form of the invention, one of the food holding members is shaped and designed more particularly for cooking of tacos. In this form of the invention the hinged side portions of the first food holding member are dished in construction whereby each is adapted to hold a V-shape uncooked taco; thus, an uncooked taco with a meat product, or the like, placed between the halves of the uncooked tortillas; thus, when the mechanism rotates into the cooking fat the side portions of the first member are collapsed, or folded up, and two tacos are simultaneously cooked, one in each side of the holding members.

Further advantages of my invention will become apparent from the following detailed description and annexed drawings wherein:

Fig. 1 is a vertical longitudinal sectional view of the cooking machine.

Fig. 4 is an enlarged sectional view taken along the line 4—4 of Fig. 1.

Figure 2:
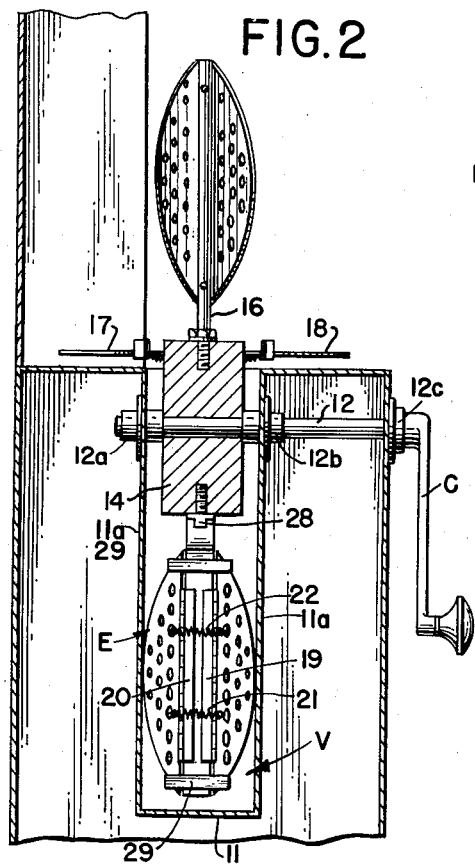
Fig. 2 is a sectional view taken along the line 2—2 of Fig. 1.
Figure 3:
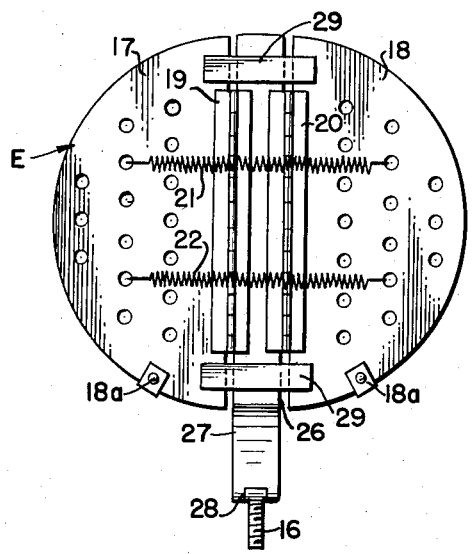
Fig. 3 is a detailed bottom plan view of one of the food holding members.

Referring now more particularly to Figs. 1 to 3 of the drawings, V designates a cooking vessel adapted to have deep frying fat therein for cooking the products, and formed with a rounded bottom 11 and vertical sides 11a spaced from each other in parallelism.

A shaft 12 is in part journalled in bearings 12a and 12b so that it extends transversely of the vessel V adjacent the top thereof. This shaft 12 is of such length that it extends through one side wall of a support K for the vessel V, where its end is journalled in a bearing 12c. At this latter end a crank C is fixed to the shaft for manual rotation thereof.

A hub 14 is fixed to the shaft 12 between the vessel walls 11a, and fixed to and extending radially from this hub at spaced intervals circumferentially thereof, are a plurality of individual food-holding units, particularly designed for the holding of tortillas but which, of course, may hold other food products.

Each food-holding unit comprises a round rod or spoke 16 bent angularly at its inner end as indicated at 16a, and screw-threaded in the periphery of the hub 14 where it is retained by a nut 16b to project radially from the hub. An arm 26 flat in form is bent at its inner end as at 27 and hinged as at 28 to a plate 28a. The inner end of the rod 16 extends through the plate 28a, the nut 16b serving to secure the plate to the periphery of the hub 14.

Each food-holding unit also includes a food-supporting and folding element E, and a food-forming element E'. The element E is made up of a pair of plate-like semi-circular shaped members 17 and 18 which have their straight edges mounted on the opposite longitudinal edges of the arm 26 by hinges 19 and 20. By means of these hinges the members 17 and 18 are mounted to occupy an extended position as shown in Fig. 3, or a folded position as shown in Fig. 4.

In the extended position the members 17 and 18 occupy coplanar positions to which they are limited by stops 29 in the form of metal strips secured to and extending transversely of the arm 26. By means of coiled springs 21 and 22 connected at their ends to the members 17 and 18 in certain of the perforations of the latter, the members are urged to the extended coplanar positions.

It is important to note that the members 17 and 18 when in coplanar position form a relatively flat round plate having a diameter slightly greater than the distance between the side walls 11a of the vessel V.

The food-forming element E' comprises a circular plate 25 which is bent diametrically into fixed V form, and secured at its bent portion to the spoke 16 beyond the bent portion 16b.

By virtue of mounting of the elements E and E' on the arm 26 and rod 16, respectively, the elements as mounted on the hub 14 are relatively movable angularly to occupy an open position in which the element E is accessible to place an uncooked tortilla or other food product flatwise thereon. Tongues 18a are fixed on the curved edges of the members 17 and 18 which aid in centering the tortilla on the element E.

In the use of the machine, the shaft 12 is first partially rotated by the crank C in a clockwise direction as when viewed in Fig. 1 to bring one of the holding units to a position at the top side of the hub 14 which is slightly past upper dead center. This causes the arm 26 to swing on the hinge 28 downwardly to a horizontal position in which the members 17 and 18 occupy a corresponding position.

An uncooked tortilla or other food product is now placed flatwise and centered on the plate members 17 and 18 whereupon, the shaft 12 is further rotated in a clockwise direction causing the members to pass downwardly into the vessel V. In so doing the curved edges of the members 17 and 18 engage the vessel walls 11a, causing them to fold or collapse into a V-shaped form whereby the tortilla is automatically bent into a V shape.

Under the frictional engagement of the curved edges of the members 17 and 18 with the walls 11a, the arm 26 is angularly rotated upwardly about the hinge 28 thereby causing the members to move toward the member 25 until the latter is nested between the members 17 and 18. Thus, the tortilla is moved toward and clamped between the elements E and E' in a V shape.

Upon continued rotation the product is rotated down into the cooking fat, is cooked and rotated back out again. As the food holding unit is rotated out of the cooking vessel, the side plates 17 and 18 are brought out of engagement with the side walls of the cooking vessel and thus, under the influence of the springs 21 and 22, these plates are again moved to a co-planar position, i.e., a flat position. As the rotary unit continues to rotate back to a position in which the collapsible holding unit is beneath the fixed V-form member 25, the collapsible unit drops away from the fixed form member 25 by gravity, whereby the cooked food product can readily be removed.

Figure 5:
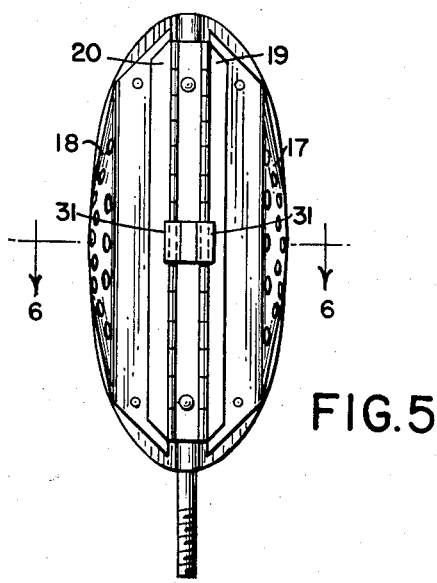
Fig. 5 is a detailed view of a modified form of food holding unit.
Figure 6:
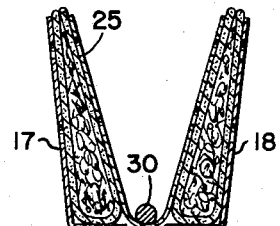
Fig. 6 is a sectional view taken along the line 6—6 of Fig. 5.

Referring to Fig. 5 of the drawings, I have shown a modified form of the invention more particularly adapted to cooking tacos. The machine of this form of the invention is like that of the previous modification except that the side plates 17 and 18 of the food holding unit in the present modification are of dished construction, as shown in Fig. 6, adapting each of them to receive therein a tortilla having between the halves thereof a partly cooked food product, such as meat to form a taco. In the present form of the invention, the side plates 17 and 18 are hinged, as in the previous form, but are not provided with biasing springs and the arm 26 is omitted. Only a straight rod 30 is employed in the place of the rod 16 in the first form of the invention. To this rod 30 the hinges 19 and 20 are secured and upon which the plates 17 and 18 are mounted to occupy a folded position as shown, and a coplanar position. This coplanar position of the plates is defined by stops 31 fixed between the hinges. The operation is similar in that as the shaft 12 rotates the plates 17 and 18 thus come into contact with the side walls 11a of the cooking vessel and they are folded upwardly, each of them clamping a taco between itself and the fixed form member 25. After the product has been rotated through the cooking fat and returns substantially to its original position, the plates 17 and 18 fall by gravity away from the fixed form member 25 into a position in which the cooked tacos can readily be removed.

The foregoing disclosure is representative of preferred forms of my invention. Various modifications and alternatives may be adopted by those skilled in the art. It is understood that the disclosure is to be interpreted in an illustrative rather than a limiting sense, and that the scope of the invention is to be in accordance with the claims annexed hereto.

What I claim is:

1. A food holding unit including a V-shaped plate-like member, and a normally flat plate-like member having two parts hingedly mounted to occupy a coplanar position relatively and a V-shaped position; spring means for urging said parts to coplanar position; and means for hingedly mounting the second-mentioned member on the first-mentioned member to swing toward or away from the latter.

2. In combination: a cooking vessel having vertical walls spaced in parallelism; a shaft mounted for rotation horizontally across said walls; a food holding unit including a V-shaped plate-like member fixed to and extending radially from said shaft, and a second member connected to the first-mentioned member, and having two parts hingedly connected to occupy one position in which they are coplanar, and another position in which they are disposed in divergent relation one to the other; and means for rotating said shaft to move said unit into and out of said vessel, said parts when coplanar of a combined width exceeding that of the distance between said walls whereby under movement of said parts into said vessel they will be moved into divergent relation to coact with the first-mentioned member for holding a food product in V-form during movement of said unit into and out of said vessel.

3. A food-cooking machine, including: a cooking vessel; food-holding means; means mounting said food-holding means for rotation into and out of said vessel, said food-holding means comprising a first holder member, a second holder member for supporting an uncooked food product thereon which is pivotally connected with the first holder member to swing angularly toward and away from the latter, said second holder member including two parts hingedly connected to each other; and spring means for urging said parts to coplanar position whereby upon rotation of said food-holding means into said vessel said parts would be caused to engage the side walls of said vessel to swing the second holder member toward the first holder member about said pivotal connection, and said parts about their hinged connections toward each other to hold the food product between said members while being cooked, and upon rotation of said food-holding means out of said vessel, permitting said parts to move to a coplanar position under the action of said spring means, and the second food-holding member to swing angularly away from the first holder member to release the cooked product.

4. In combination: a cooking vessel having upstanding walls spaced horizontally one from the other; a shaft mounted for rotation horizontally across said walls; a food-holding unit including a V-shaped member fixed to and extending radially from said shaft, and a second member pivotally connected to the V-shaped member to swing about an axis paralleling said shaft, said second member having two parts hingedly connected to occupy one position in which they are coplanar, and another position in which they are in divergent relation; and means for rotating said shaft to move said unit into and out of said vessel, said parts when coplanar of a combined width exceeding that of the distance between said walls whereby under movement of said parts into said vessel they will be moved into divergent relation and the second member swung upwardly toward the V-shaped member to cause said parts to coact with the latter for holding a food product in V-form during movement of said unit into said vessel, and when said unit is moved out of said vessel to a point past upper dead center the second member will swing about its pivotal connection to a position at right angles to the V-shaped member.

5. A combination as embodied in claim 4, wherein spring means is provided for urging said parts to coplanar position when moved out of said vessel.

6. A combination as embodied in claim 4, wherein tongues are fixed on the edges of said parts to center the food product when placing it on said parts.

7. In combination: a cooking vessel having upstanding walls spaced horizontally one from the other; a shaft mounted for rotation horizontally across said walls; a food-holding unit including a first member fixed to and extending radially from said shaft, and a second member mounted on said shaft and having two parts hingedly connected to occupy an extended position in which they are substantially coplanar, and a folded position around the first member to hold a food product between the members; and means for rotating the shaft to move said unit into and out of said vessel, said parts when coplanar of a combined width exceeding that of the distance between said walls whereby under movement of said parts into said vessel they will be moved to folded position.

8. A food-cooking machine, including a cooking vessel, food-holding means, means including a shaft for mounting said food-holding means for rotation about a horizontal axis into and out of said vessel, said food-holding means comprising a V-shaped member fixed to and extending radially from said shaft, and a second member pivotally connected to the V-shaped member to swing about an axis paralleling said shaft, said second member having two parts hingedly connected to occupy one position in which they are coplanar and another position in which they are in divergent relation, and means engaging said second member responsive to rotation of the food-holding means into the vessel for moving said members relatively to hold the product therebetween while being cooked.

9. In combination, a cooking vessel having vertical walls spaced in parallelism; a shaft mounted for rotation horizontally across said walls, a food-holding unit including a V-shaped plate-like member fixed to and extending radially from said shaft, and a second member pivotally connected to the first mentioned member to swing about an axis paralleling said shaft said second member having two semi-circular parts dished at their confronting sides hingedly connected to occupy one position in which they are substantially coplanar and another position in which they are disposed in divergent relation one to the other; and means for rotating said shaft to move said unit into and out of said vessel, said parts when coplanar of a diameter exceeding that of the distance between said walls whereby under movement of said parts into said vessel they will be moved into divergent relation to coact with the first-mentioned member for holding food products between said parts and at each side of the first-mentioned member during movement of said unit between said walls, and when moved from between the latter allowing said parts to gravitate to coplanar position.

References Cited in the file of this patent

UNITED STATES PATENTS

| | | |
|---|---|---|
| 61,515 | Chamberlain | Jan. 29, 1867 |
| 967,147 | Trewick | Aug. 9, 1910 |
| 2,352,447 | Powers | June 27, 1944 |
| 2,557,467 | Rodriguez | June 19, 1951 |
| 2,719,480 | Prickett | Oct. 4, 1955 |
| 2,739,525 | Giambertoni | Mar. 27, 1956 |